Figure 1:
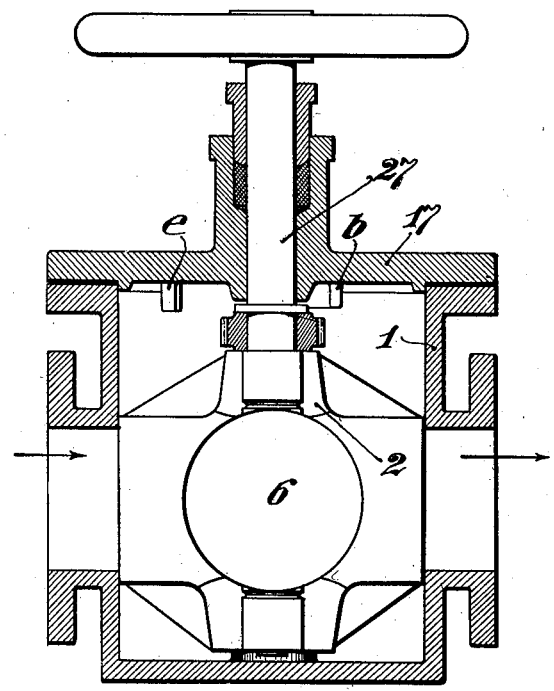

Jan. 26, 1926.　　　　　A. BÖTTNER　　　　　1,570,990

STEAM CUT-OFF VALVE

Filed July 10, 1925　　　　3 Sheets-Sheet 1

Inventor:
Arno Böttner
Attorney

Jan. 26, 1926.  1,570,990
A. BÖTTNER
STEAM CUT-OFF VALVE
Filed July 10, 1925   3 Sheets-Sheet 2

Inventor:
Arno Böttner
By
Attorney

Jan. 26, 1926.

A. BÖTTNER 1,570,990

STEAM CUT-OFF VALVE

Filed July 10, 1925    3 Sheets-Sheet 3

Inventor:
Arno Böttner
By
Attorney

Patented Jan. 26, 1926.

1,570,990

UNITED STATES PATENT OFFICE.

ARNO BÖTTNER, OF SUDENBURG, NEAR MAGDEBURG, GERMANY, ASSIGNOR TO THE FIRM: POLTE, OF MAGDEBURG, GERMANY.

STEAM-CUT-OFF VALVE.

Application filed July 10, 1925. Serial No. 42,785.

*To all whom it may concern:*

Be it known that I, ARNO BÖTTNER, a citizen of the German Republic, residing at Sudenburg, near Magdeburg, Germany, have invented certain new and useful Improvements in Steam-Cut-Off Valves, of which the following is a specification.

This invention relates to steam-cut-off or stop valves having a preferably cylindrical valve body with a smooth bore for the steam to pass therethrough, two cut-plates in the said valve-body and a spindle or stem adapted to be turned only without any movability in axial direction.

The present invention is in some respects similar to, and may therefore be regarded as an improvement on, the invention heretofore applied for by me on 5th May 1925, Serial No. 28122, wherein the said spindle or stem is arranged to cause both the rotary valve body to be turned and the two cut-off plates to be moved in respect of the co-operating sealing surfaces. In the stated prior application the several movements are brought about with the aid of two coupling pawls pivotally connected with the valve body and adapted to co-operate, at the proper time, with cam faces on the cover of the valve casing to automatically come in or out of engagement with the spindle or stem, whilst the two cut-off plates are operated with the aid of two cam-shafts or the like adapted to be positively driven by the spindle or stem by means of a toothed gearing.

According to the present invention I have discarded the coupling pawl arrangement altogether and I have simplified the construction by utilizing the toothed gearing in lieu of the coupling pawl arrangement, for bringing about the several movements to be effected by the rotation of the spindle or stem, whereby the valve is greatly improved also as regards durability, efficiency and even in economical respects.

To this end I provide means by which the two toothed wheels keyed to the two cam-shafts will remain locked, at the rotation of the spindle or stem, during the period of time where the whole valve body must rotate in the closing or in the opening direction, so that the two wheels then cannot move, and will not be released or unlocked until the two cut-off plates located in the valve body are to be moved for the opening or the sealing purpose.

The invention is more specifically described in the following specification and shown in the accompanying drawings forming a part of this specification and in which there is exhibited one example or embodiment of the invention which is in no way intended as a limitation upon the scope of the appended claims as it is to be clearly understood that variations and modifications which properly fall within the scope of said claims may be resorted to when found expedient.

Figure 2:
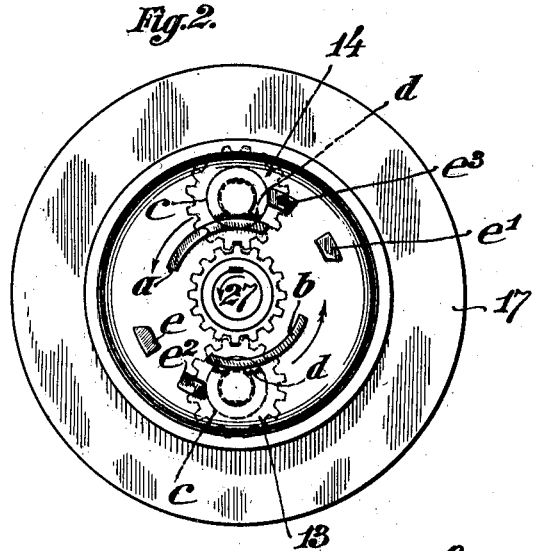
Figure 3:
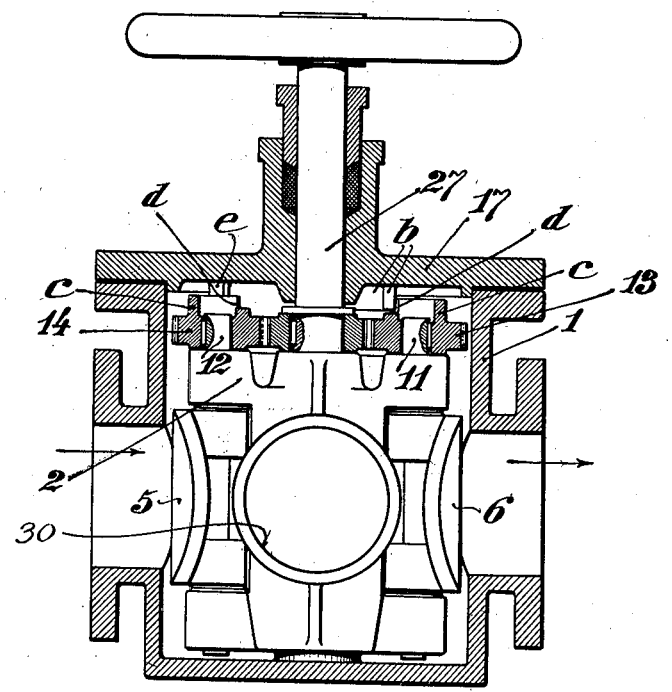
Figure 4:
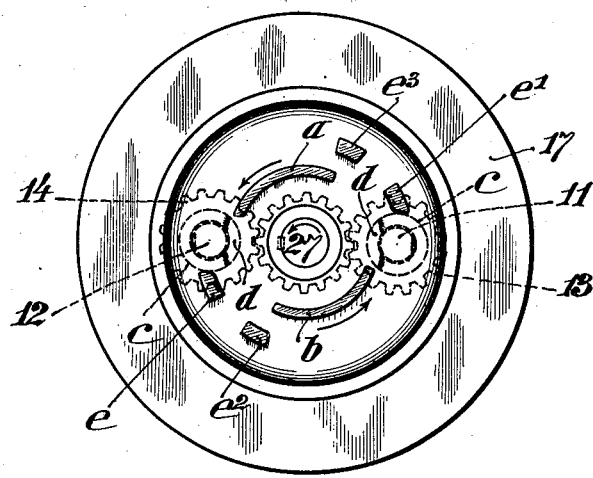
Figure 5:
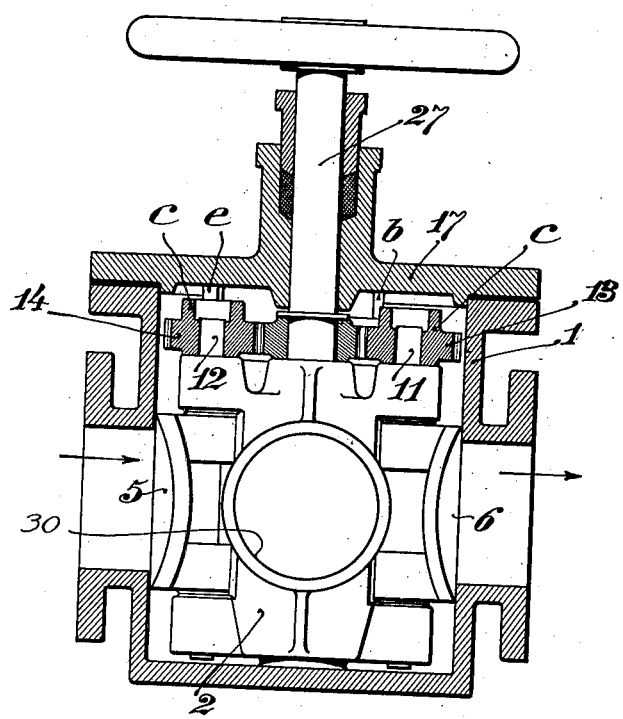
Figure 6:
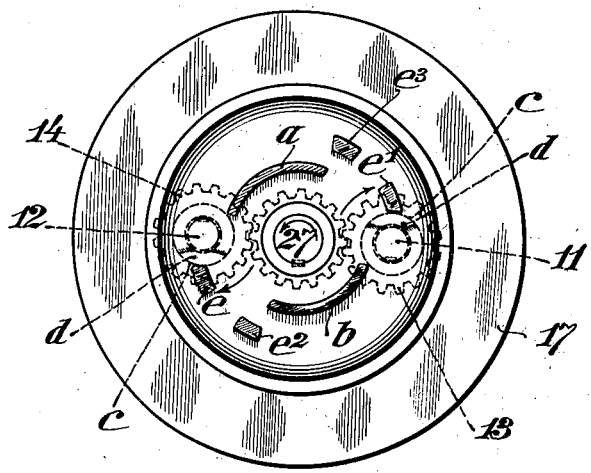

In the accompanying drawings wherein like characters designate like parts throughout the several views: Figure 1 is a view in longitudinal section of the valve embodying the present invention; Figure 2 is a plan view of the cover of the valve casing showing the inner side thereof; Figure 3 is a view similar to that of Figure 1 but with the valve body and cooperating parts shown in a different position; Figure 4 is a view similar to that of Figure 2 but corresponding to Figure 3; Figure 5 is a view likewise similar to that of Figure 1, but with the valve body and cooperating parts shown in still another position; and Figure 6 is a view similar to that of Figure 2, but corresponding to Figure 5.

Referring to the drawings it will be seen that on the inside of the cover 17 of the valve casing 1 two curved cams or ribs $a$ and $b$ are provided which are firmly connected or integral with the cover and located in symmetrical opposition with relation to each other and the spindle or stem 27. The hubs $c$ of the toothed wheels 13 and 14 keyed to the vertical shafts 11 and 12, respectively, are recessed or have a portion cut out of each at a place $d$, as shown by dotted lines in Figures 2, 4 and 6, so as to conform to the contour of the curved ribs. The shafts 11 and 12 are each provided with a cam or cams, not shown, which cams are adapted to actuate the plates 5 and 6. The shafts 11 and 12 extend vertically through the valve body as clearly shown in Figs. 3 and 5.

If the valve is open and the axis of the smooth opening or passage 30 of the valve body 2 coincides with the axis of the conduit, as in Figures 1 and 2, the two curved ribs $a$ and $b$ engage in the curved recesses $d$ of the two wheels, so that the wheels 13 and 14 will be locked and on turning the spindle or stem 27 by means of the hand-wheel in the direction of the arrows shown in Figure 2, the wheels cannot rotate about their axes, but they bodily turn together with the valve body as a unit only. If thus the valve body is turned by means of the spindle and hand-wheel for 90° and the parts adopt the positions shown in Figures 3 and 4, the horizontally displaceable cut-off plates 5 and 6 will lie in front of and in axial alignment with the conduit, as clearly shown in Figure 3, stops $e$ and $e^1$ being provided on the cover 18 for the hubs $c$ of the two wheels 13 and 14 to abut against in order to limit the rotary movement of the valve body, see Figure 4. As will be seen in Figure 4 the recesses $d$ of the hubs of the two toothed wheels 13 and 14 are not engaged by the two curved ribs $a$ and $b$ when the parts are in the positions shown in Figures 3 and 4, so that on a continued rotation of the spindle by means of the hand wheel in the direction of the arrows shown in Figures 2 or 4 the toothed wheels 13 and 14 will be caused to rotate in order to move and press the two cut-off plates 5 and 6 against the co-operating sealing faces of the valve casing, that is to say, to move the same by means of the cam-shafts from the positions illustrated in Figure 3 to those shown in Figure 5.

To re-open the valve the hand wheel must be turned in the opposite direction whereby the two toothed wheels 13 and 14 will be caused to rotate—likewise in opposite direction, of course—and the cut-off plates 5 and 6 will be withdrawn from their sealing seats, that is to say, from the positions shown in Figure 5 to those illustrated in Figure 3. The toothed wheels 13 and 14 are prevented from rotating further or beyond the latter positions since the cut-off plates are stopped in the valve body and cannot recede beyond the positions shown in Figure 3, where the recesses $d$ of the hubs of the wheels again have regained the previous positions shown in Figure 4, so that on a continued rotation of the hand wheel in the same direction the valve body will be turned from the position illustrated in Figure 3 to that shown in Figure 1 and with the recesses $d$ of the wheel hubs sliding over and along the curved ribs $a$ and $b$. The valve thus is opened to its full position and rotation of the valve body beyond this position is prevented by stops $e^2$ and $e^3$ on the inside of the cover and limiting the rotary movement of the valve body.

It goes without saying that my invention, whilst still being adhered to in its main essentials, may be varied and adapted in many ways, according to the requirements desired or most suitable under different circumstances. Thus the stops or abutments $e$, $e^2$ and $e^1$, $e^3$ or equivalent formations on the cover may be united and shaped so that each pair of stops will form a unit or single stop only.

What I claim is:—

1. A stop valve of the character set forth, comprising a casing, a cover on the said casing, a rotary valve body fitted in said casing and having a transverse bore, two cut-off plates attached to the said valve body diametrically opposite each other and parallel to the bore thereof; a spindle adapted to be turned but not moved lengthwise, for moving the said valve body and controlling the said cut-off plates, two shafts mounted in the said valve body, cam-like formations on the said shafts, a toothed gearing for transmitting motion from the spindle to the said shafts and including a driving wheel on the spindle and a driven wheel on each of the two shafts, two curved ribs on the inside of the said cover, and recesses cut in the two driven wheels of the toothed gearing and adapted to cooperate with the said curved ribs, substantially as and for the purpose set forth.

2. A stop valve of the character set forth, comprising a casing, a cover on the said casing, a rotary valve body fitted in said casing and having a transverse bore, two cut-off plates attached to said valve body diametrically opposite each other and parallel to the bore thereof, a spindle adapted to be turned but not movable lengthwise, for moving the said valve body and controlling the said cut-off plates, two shafts mounted in the said valve body, camlike formations on the said shafts, a toothed gearing for transmitting motion from the spindle to the said shafts and including a driving wheel on the spindle and a driven wheel on each of the two shafts, two curved ribs on the inside of the said cover, recesses cut in the two driven wheels of the toothed gearing and adapted to cooperate with the said curved ribs and stops firmly connected with the inside of the said cover for the said driven wheels to abut against in order to limit the strokes of the valve body, substantially as and for the purpose set forth.

3. The valve cover 17, having two curved ribs, $a$, $b$, and stops, $e$, $e^1$, $e^2$, $e^3$, on its inside face, substantially as shown, for the purpose specified.

In testimony whereof I affix my signature.

ARNO BÖTTNER.